United States Patent [19]

Sharkasi et al.

[11] Patent Number: 5,126,158
[45] Date of Patent: Jun. 30, 1992

[54] BEVERAGE COMPOSITIONS COMPRISING A DIPEPTIDE SWEETENER, SACCHARIN SALT AND HYDROCOLLOIDAL POLYSACCHARIDE

[75] Inventors: Tawfik Sharkasi, Danbury; Margaret J. Havekotte, Greenwich, both of Conn.

[73] Assignee: PepsiCo Inc., Purchase, N.Y.

[21] Appl. No.: 758,225

[22] Filed: Sep. 9, 1991

Related U.S. Application Data

[63] Continuation of Ser. No. 564,012, Aug. 7, 1990, abandoned.

[51] Int. Cl.⁵ ............................................. A23L 2/38
[52] U.S. Cl. ....................................................... 426/548
[58] Field of Search ........................................... 426/548

[56] References Cited

U.S. PATENT DOCUMENTS 3,780,189  12/1973  Scott ............................ 426/548 X

OTHER PUBLICATIONS

Jacobs, Manufacture and Analysis of Carbonated Beverages, 1959, Chemical Publishing Co., Inc.: New York, pp. 173–175.

*Primary Examiner*—Joseph Golian
*Attorney, Agent, or Firm*—Scully, Scott, Murphy & Presser

[57] ABSTRACT

The present invention relates to novel beverage compositions and is particularly suitable for preparing beverages of the dietetic type with improved mouthfeel and sweetness qualities. The beverage compositions of the present invention are comprised of at least one food-acceptable hydrocolloidal polysaccharide, a saccharin salt, and a dipeptide sweetener to said saccharin salt being in the range of about 50:1 to about 25:1.

15 Claims, 5 Drawing Sheets

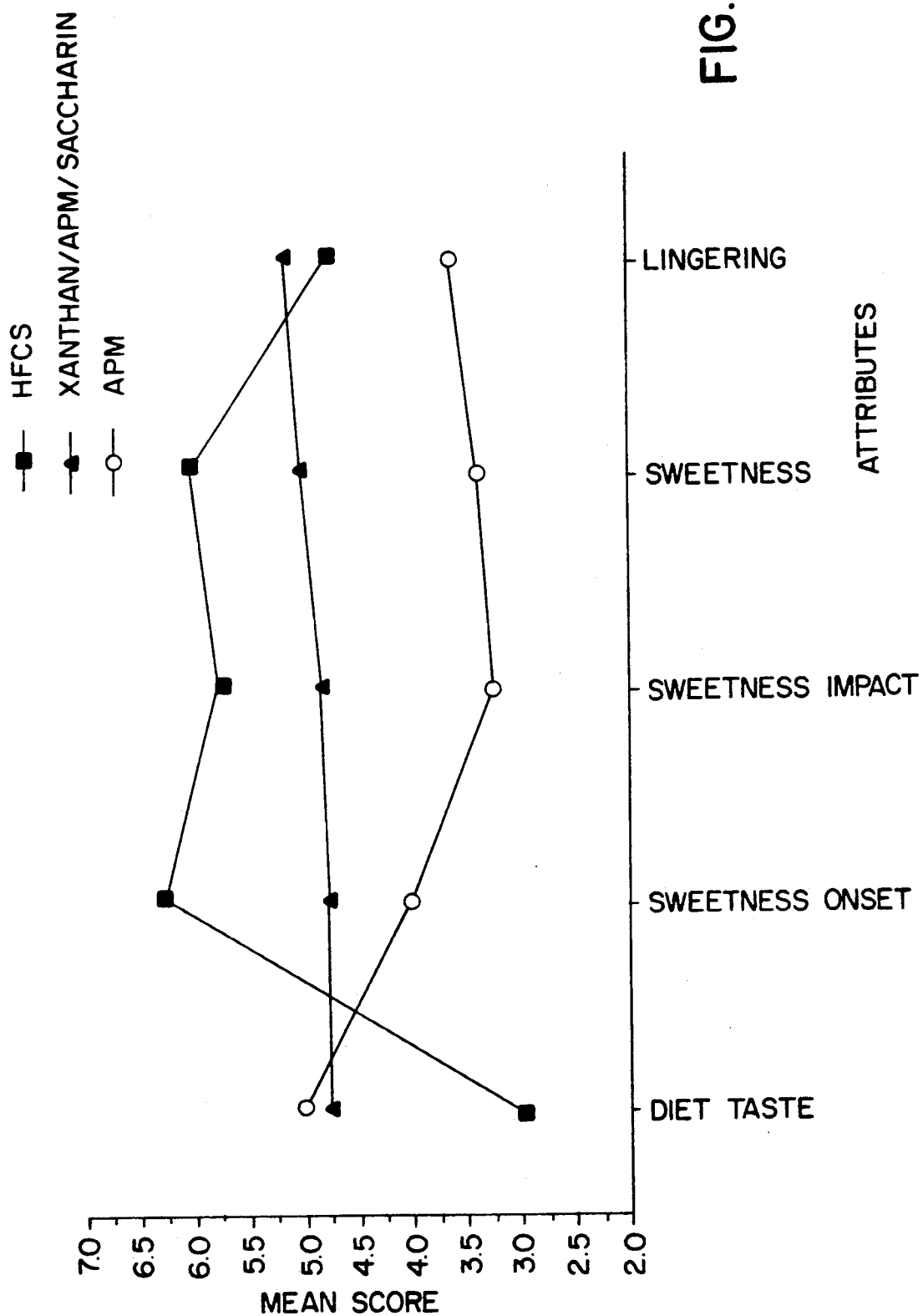

BEVERAGE COMPOSITIONS COMPRISING A DIPEPTIDE SWEETENER, SACCHARIN SALT AND HYDROCOLLOIDAL POLYSACCHARIDE

This application is a continuation of application Ser. No. 564,012, filed on Aug. 7, 1990, and now abandoned.

BACKGROUND OF THE INVENTION

1. Field of the Invention

The present invention relates to novel beverage compositions and is particularly suitable for preparing beverages of the dietetic type with improved mouthfeel and sweetness qualities. The beverages of the present invention involve compositions composed of at least one food-acceptable hydrocolloidal polysaccharide, a saccharin salt, and an aspartyl phenylalanine methyl ester sweetener.

2. Description of the Prior Art

It is very desirable, for obvious reasons, for beverages to have good mouthfeel characteristics. The presence of different concentrations of suspended and dissolved substances, such as sugars, will often significantly affect mouthfeel. The deletion of sugars in a dietetic beverage where an artificial sweetener is used, consequently leaves a great deal to be desired. It is well known that included principally among the adverse properties of dietetic beverages are a lack of texture and mouthfeel sufficiently similar to that of sugar sweetened beverages. Despite numerous attempts to eliminate the concomitant aftertaste of dietetic beverages, the art has achieved only limited success in attempting to closely approximate the taste, mouthfeel, and texture characteristics of sugar-sweetened beverages.

The beverage composition of the present invention includes a dipeptide sweetener. Aspartyl phenylalanine methyl ester sweeteners are examples of these dipeptide sweeteners which are disclosed in U.S. Pat. No. 3,475,403 and are represented by the following structural formula:

$$H_2NCHCONHCHOO\text{-(lower alkyl)}$$
$$| \quad\quad\quad\quad |$$
$$CH_2 \quad\quad\ X$$
$$|$$
$$COOH$$

wherein X is selected from the group of radicals consisting of:

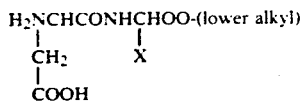

and

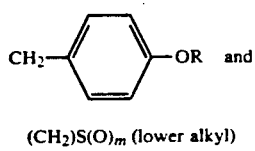

$(CH_2)S(O)_m$ (lower alkyl)

R being a member of the group consisting of hydrogen and a lower alkyl radical, m an integer selected from the group consisting of 0 and 2 and n a positive integer less than three.

The most widely-known dipeptide base sweetener is α-L-Aspartyl-L-phenylalanine methyl ester (hereinafter referred to as Aspartame). Aspartame has sweetness of good quality and a degree of sweetness about 200 times the sweetness of sucrose. The use of aspartame as a diet sweetener is very widespread.

Unfortunately, however, the aforesaid dipeptide sweeteners have been found to be relatively unstable compounds. For example, aspartyl phenylalanine methyl ester undergoes decomposition or change relatively readily under certain conditions to form a diketopiperazine, causing a significant diminution in sweetening power. When aspartyl phenylalanine methyl ester is admixed with water, it does not dissolve readily but tends to lump, said lumps dissolving with some difficulty. The foregoing considerations have presented substantial problems in preparing the said dipeptide sweeteners in a form such that advantage can be effectively taken of their high sweetening properties while, at the same time, avoiding as much as it is reasonably possible the problems inherent in the solubility and instability characteristics of said dipeptides.

Saccharin is an ingredient commonly employed as a sugar substitute but offers the drawback of having an objectionable bitter, metallic aftertaste. The incidence of off-taste due to saccharin has been reported to be a function of the concentration of the compound. It has further been reported that everyone can be expected to obtain an off-taste from saccharin at some concentration. Combinations of saccharin with such ingredients as pectin or sorbitol, maltose, dextrose, etc. have been tried in hopes of eliminating the aftertaste. Combinations of saccharin and salts of cyclamates have been used as well but none of the aforementioned combinations have achieved the desired result.

Although on a weight for weight basis saccharin at its threshold level of sweetness is about 700 times as sweet as sucrose, at normal use levels it is only 200–400 times as sweet as sucrose. The sweetness of saccharin relative to sucrose decreases as the concentration of saccharin increases. In order to obtain a given increase in sweetness level with saccharin, it is consequently necessary to employ a proportionately greater concentration of saccharin. This increased level of saccharin in turn causes a greater perception of objectionable aftertaste.

Hydrocolloidal polysaccharides, as employed herein, is a term which includes natural gums, modified or synthetic gums and synthetic ethers of polysaccharides.

Gums are high polymer carbohydrates that are insoluble in alcohol and other organic solvents, but generally soluble or dispersible in water. Natural gums are hydrophilic polysaccharides composed of monosaccharide units joined by glycosidic bonds. They occur, for example, in various trees and shrubs in tropical areas, in seaweed, or a phycocolloids (algae). Their chief use is as protective colloids and emulsifying agents in food products and pharmaceuticals.

U.S. Pat. Nos. 2,761,783; 2,876,107; 3,061,445; 3,294,544; 3,413,125; 3,476,571; 3,987,211 and 4,228,198 disclose types of beverages which include in their composition saccharin and a gum. None of the aforementioned patents, however, suggest the use of an aspartyl phenylalanine methyl ester sweetener in the described compositions.

U.S. Pat. Nos. 3,695,898; 3,780,189; 3,934,047; 4,001,455; 4,009,292 and 4,690,827 relate to compositions including aspartame and saccharin but do not disclose the use of a gum in combination therewith.

U.S. Pat. No. 4,051,268 suggests a solid beverage composition, including aspartame and an edible gum but does not describe the use of saccharin in the composition.

SUMMARY OF THE INVENTION

It has been now discovered that when at least one food-acceptable hydrocolloidal polysaccharide is present in a beverage composition together with a saccharin salt and an aspartyl phenylalanine methyl ester sweetener, a beverage is produced with very pleasing mouthfeel characteristics.

The present invention relates to a beverage composition comprising at least one food acceptable hydrocolloidal polysaccharide, a saccharin salt and an aspartyl phenylalanine methyl ester sweetener, the ratio to said saccharin salt being in the range of about 60:1 to about 10:1.

The outstanding results realized with the present, new compositions could not have been predicted from the prior art. Although some prior art, in general, disclose that aspartame, saccharin and a gum might be used together in a beverage product, none of the prior art, singularly or in combination, disclose the three ingredients in the particular ratios set forth herein and which produce the unexpected and improved beverage. See U.S. Pat. Nos. RE 29, 682; 3,753,739; 4,081,567; 4,582,712; 4,716,046; 4,722,844; 4,769,244 and 4,384,990 and EP-A-0239938.

The present invention resides in the certain ratios of saccharin to APM, but only in the presence of a hydrocolloidal polysaccharide, where the characteristics of the resulting beverage shows substantially improved mouthfeel.

The beverage compositions of the present invention may also include, if desired, supplemental ingredients or adjutants such as caffeine, vanilla and other flavoring agents, stabilizers, surfactants, preservatives, flow conditioners and the like.

BRIEF DESCRIPTION OF THE DRAWINGS

FIG. 1 depicts the textural differences between the HFCS beverage and beverage composition according to the present invention, as well as a beverage composition with aspartame as its only sweetener.

FIG. 2 depicts the flavor impact on the texture of the composition of the present invention as two beverage of the present invention differing in only flavor are rated against the HFCS composition.

FIG. 3 illustrates the hydrocolloidal polysaccharide impact on the texture of the composition of the present invention. A composition according to the present invention is rated against the HFCS composition as is a similar composition without the hydrocolloidal polysaccharide.

FIG. 4 shows the saccharin impact on texture of the beverage composition of the present invention. Rated against the HFCS beverage is a composition of the present invention and a similar composition differing in only the absence of saccharin.

FIG. 5 is a graph representing the sweetness profile of the composition of the present invention as compared to the HFCS beverage and a beverage composition consisting of aspartame as its only sweetener.

DESCRIPTION OF THE PREFERRED EMBODIMENTS

While the beverage compositions of the present invention are operable with any hydrocolloidal polysaccharide, the invention is particularly effective with the use of natural gums and modified gums, such as synthetic esters of polysaccharides.

Exemplary natural gums include xanthan gum, guar gum, pectin, agar, algin, carrageenan, gum arabic, gum karaya, gum tragacanth, locust beam gum, tamarind gum, larch gum and okra gum.

Modified gums include cellulose and starch derivatives and certain synthetic gums such as low-methoxyl pectin, propylene glycol alginate, sodium alginate, sodium carrageenate, triethanolamine alginate, carboxymethyl locust bean gum and carboxymethyl guar gum. Cellulose gums include, among others, methyl cellulose, sodium carboxymethyl cellulose, hydroxyethyl cellulose and ethyl cellulose.

Of course, only food acceptable "gums" should be employed. The preferred hydrocolloidal polysaccharides include xanthan gum, guar gum, pectin, methyl cellulose, propylene glycol alginate, and combinations of xanthan gums with any other hydrocolloidal polysaccharides as well as combinations of pectin and guar gum. The amount of gum used depends on the target sugar you are trying to match. Varying amounts of gum will give varying characteristics as to mouthfeel and viscosity. Generally, gums will be used in the range of about 25 mg/l to about 10 g/l depending on molecular size, desired viscosity, gum synergy, and desired calorie content. For example, for a 1.3 to a 1.5 cps viscosity, 1 calorie beverage, gums will most preferable be used in the range of about 25 to about 800 mg/l.

The preferred aspartyl phenylalanine methyl ester sweetener to be used in the present invention is aspartame. The ratio of the dipeptide sweetener to saccharin can also be varied to produce desired results but generally the ratio of the dipeptide sweetener to saccharin is from about 60:1 to about 10:1 and most preferably falls in the range of from about 50:1 to about 25:1.

Tests were done to determine which ingredients (i.e., flavor, sweetener blend, gum) are critical in the perception of texture via MPA (mouthfeel panel analysis) evaluation and instrumental viscosity measurements. Beverage compositions were evaluated against a regular, full caloried, HFCS beverage to determine which beverage ingredient or ingredient combination best approaches the texture of a HFCS-sweetened beverage.

Figure 1:
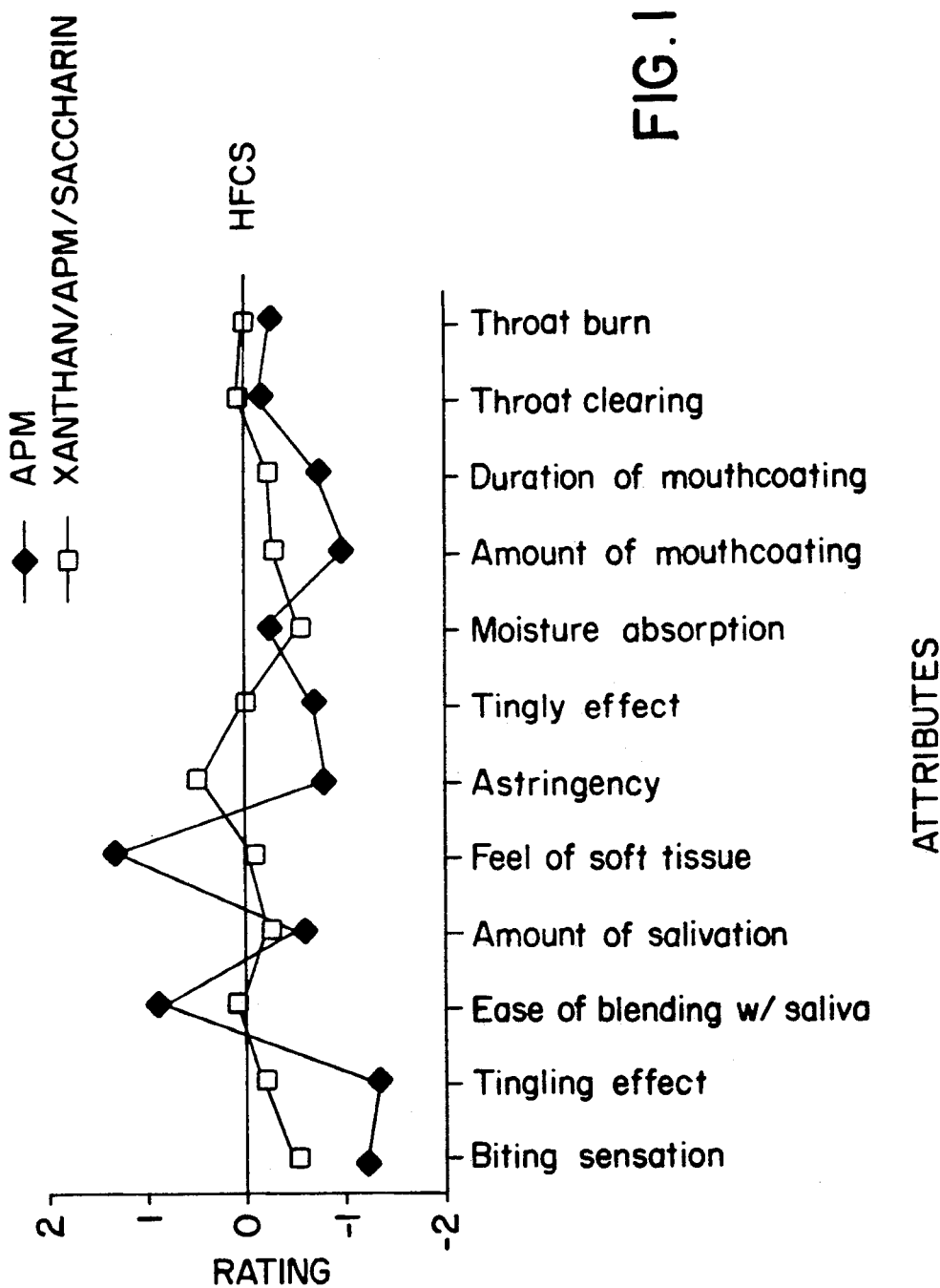
FIGS. 1 through 4 are graphs rating the various attributes of beverage compositions. The mean of 0 on the rating scale relates to a High Fructose Corn Syrup (HFCS) beverage composition.

As shown in FIG. 1, when HFCS was tested versus a xanthan/aspartame/saccharin combination, no significant textural differences were found to exist. Results of the test proved to be reproducible.

HFCS was then tested against an aspartame beverage. The latter was detectably different in textural characteristics when compared to the HFCS-sweetened beverage as shown in FIG. 1. The attribute "feel of soft tissue" appears to be one of the more significant differences found between the regular and diet products. Amount of mouthcoating and tingly effect were also found to be significantly less when compared to the HFCS-sweetened beverage.

Figure 2:
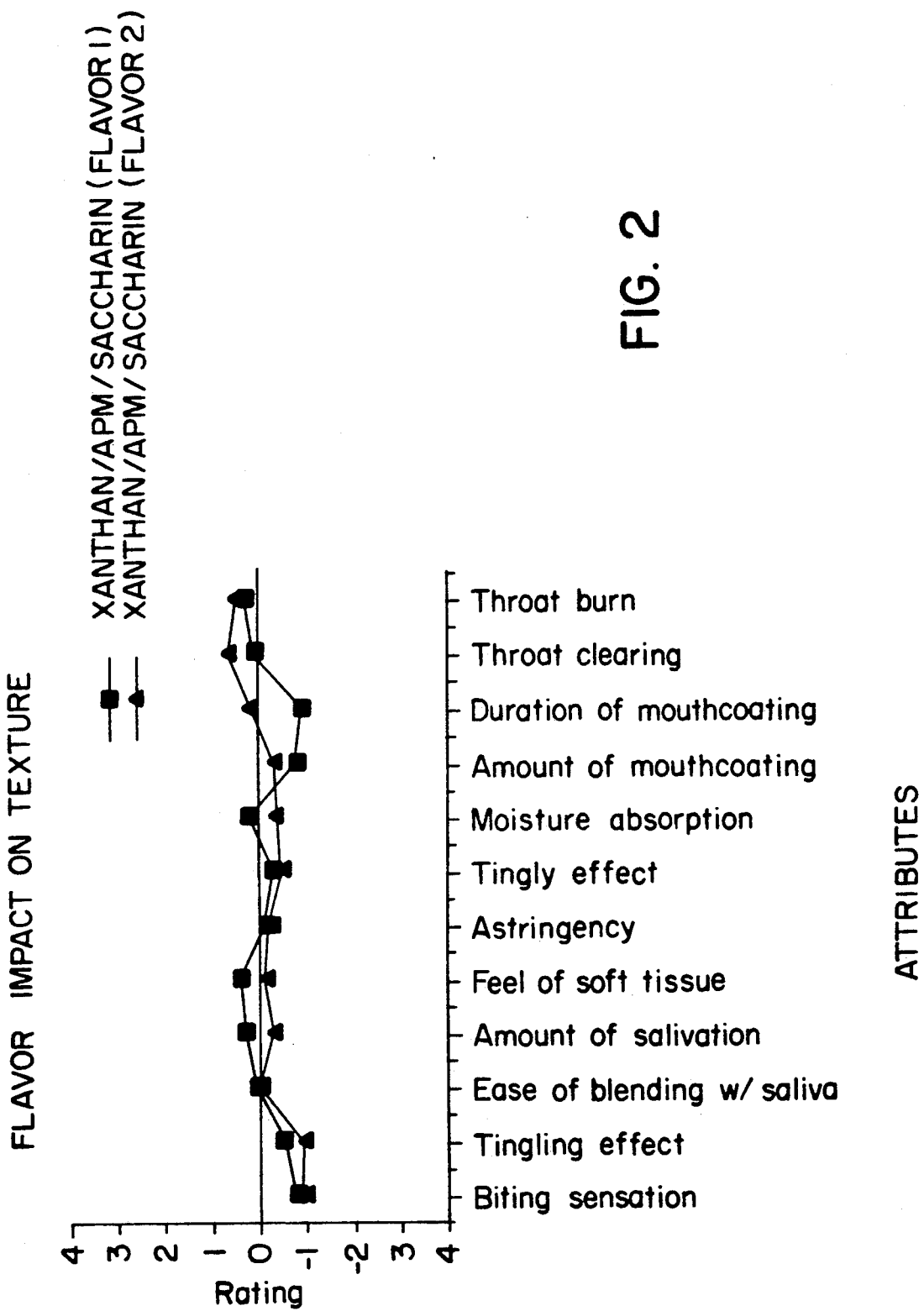

FIG. 2 shows the results of flavor impact. Few significant textural differences were found between the products where the only variable was flavor; however, there were directional differences between the flavors which may be used to formulate specific characteristics; for example, the aspartame beverage was found to be significantly more throat clearing when compared to the HFCS beverage.

Figure 3:
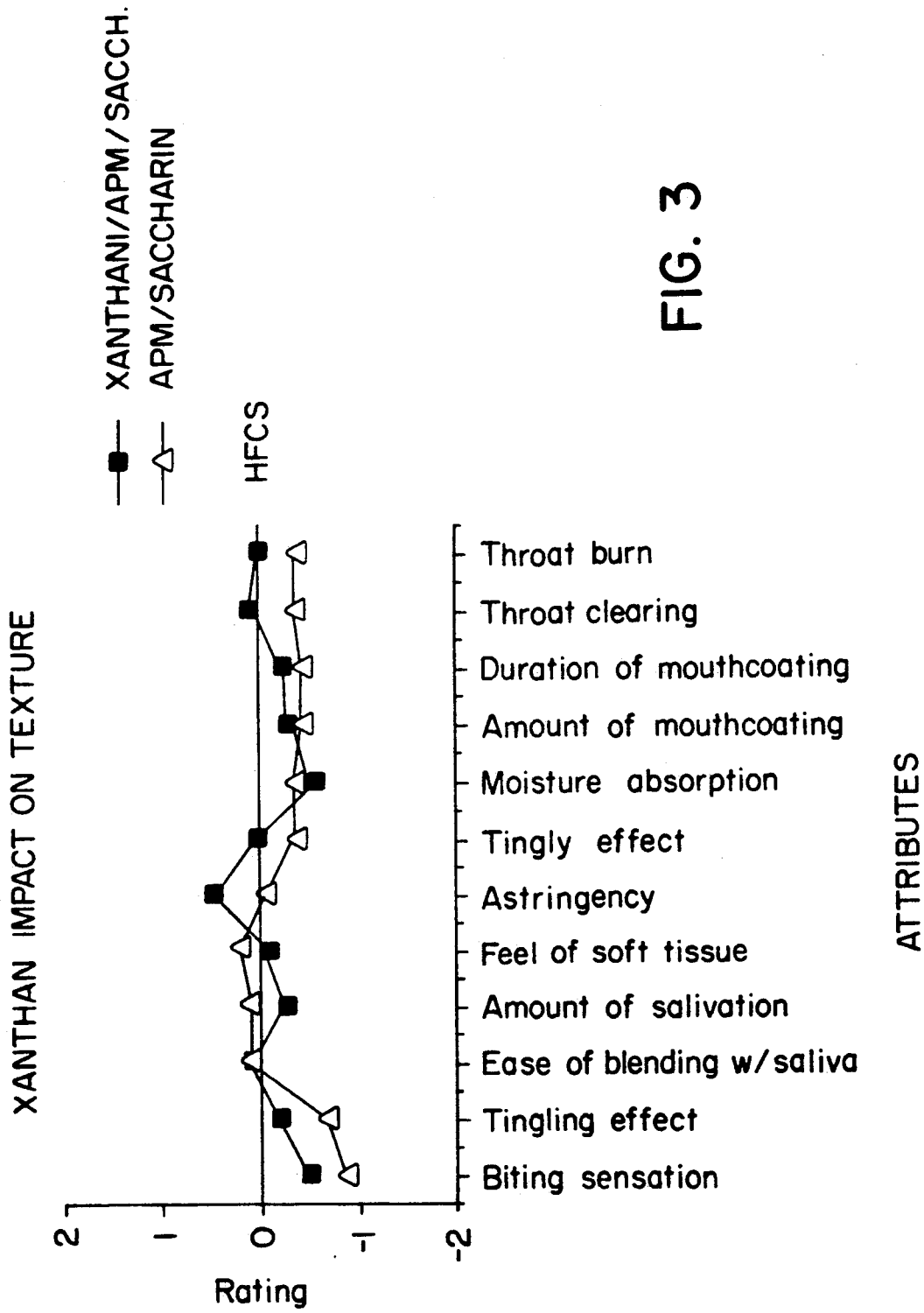

Looking at FIG. 3, one can see the products containing the xanthan gum were directionally rated as tasting more like an HFCS beverage. The products without xanthan were found to possess textural traits less similar to an HFCS-containing product than a product which contained xanthan gum, particularly in the attributes of biting, tingly effect, ease of blending, feel of soft tissue, mouth coating, duration of coating, throat clearing and throat burn.

Figure 4:
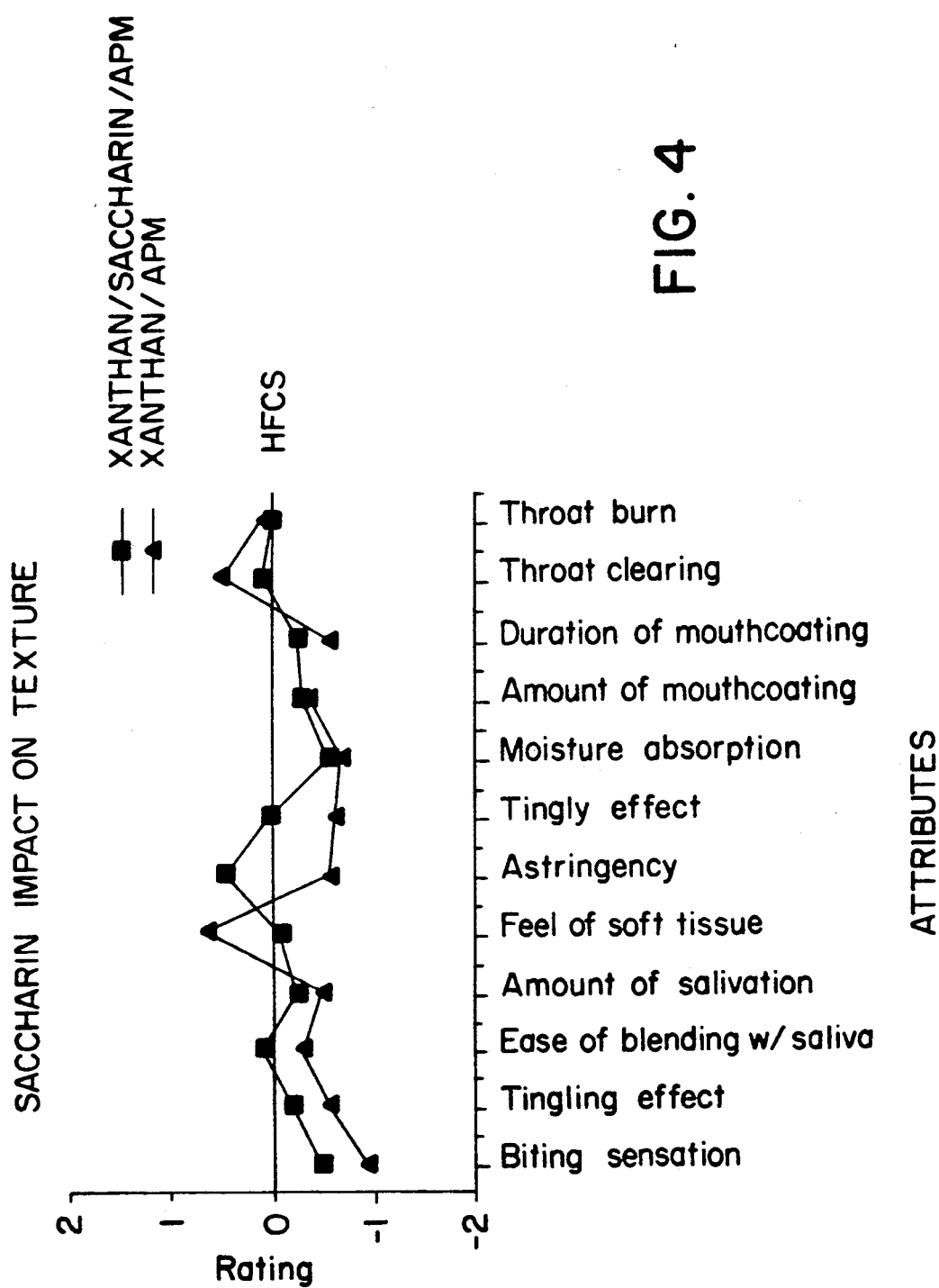

FIG. 4 shows the differences of the sweetener blend (aspartame and saccharin with xanthan) versus the xanthan/aspartame combination. The products with the artificial blend (containing saccharin) were directionally rated as tasting more like the HFCS beverage composition. The products with the sweetener blend were found to be more like the texture of HFCS-sweetened products in every attribute.

The results of the MPA demonstrate the importance of three ingredients (i.e., flavor, sweetener and hydrocolloids) in texture perception. Few significant differences were found between these products and the HFCS-sweetened product; however, the overall profile of each product (without xanthan or without sweetener blend) was found to be directionally rated as tasting texturally less like HFCS-sweetened compositions rather than the present new compositions.

A viscosity analysis, as shown in Table 1, was conducted to demonstrate the physical textural differences which exist between diet products prepared with or without xanthan versus a regular-HFCS beverage.

TABLE 1

| Viscosity Results | |
|---|---|
| HFCS | 1.34 cps |
| APM/saccharin | 1.00 cps |
| Xanthan/APM/saccharin | 1.41 cps |
| Xanthan/APM | 1.41 cps |
| Xanthan/APM/saccharin (new flavor) | 1.36 cps |
| APM | 1.00 cps |

*Products were stable with time. The four-month old HFCS regular beverage and the xanthan/aspartame/saccharin beverage showed no viscosity change in a 2.5–2.7 pH environment A sensory analysis was performed on beverages containing HFCS, xanthan/aspartame/saccharin, and aspartame alone to determine the difference in the attributes of aftertaste, bite, carbonation, diet taste, mouthfeel, smoothness, sweetness and flavor. No significant differences were found between the HFCS beverage and the xanthan/aspartame/saccharin beverage except in diet taste. The amount of aftertaste did not differ.

Sweetness profiling was performed on the beverages containing xanthan/aspartame/saccharin, solely aspartame, aspartame/xanthan and aspartame/saccharin as shown in FIG. 5. Saccharin was found to be the controlling ingredient, with regard to sweetness character, in the beverage matrix. Xanthan had little impact on sweetness quality. No significant differences were found in any sweetness attributes between HFCS and xanthan/saccharin/aspartame or between HFCS and aspartame/saccharin. The sweetness quality is driven by the small quantity of saccharin.

EXAMPLE 1

A beverage composition was made by predissolving xanthan gum using a high shear mixer at 160 F. Upon complete dissolution of the xanthan, the contents were transferred to a one liter beaker. Sodium saccharin was dissolved and added to the beaker. Phosphoric 80% was mixed in followed by the addition of predissolved caffeine. Aspartame was dissolved into the acid mixture, flavor concentrate was then added and contents brought to volume.

| Beverage Formula | |
|---|---|
| flavor concentrate | 14.60 grams |
| caffeine | .64 grams |
| APM | 3.40 grams |
| phosphoric 80% | .53 grams |
| xanthan | .59 grams |
| sodium saccharin | .07 grams |
| *water to volume | |
| Total | 1.00 liter |
| Flavor Concentrate | |
| citric | 35.95 grams |
| caramel | 705.85 grams |
| phosphoric 80% | 70.10 grams |
| flavor | 22.89 grams |
| water to volume | |
| Total | 1.00 liter |

*Carbonation level dependent on beverage

EXAMPLES 2–4

Beverage formulations were made in accordance with Example 1 with variations in calcium/sodium saccharin.

| CALCIUM/SODIUM SACCHARIN FORMULATIONS | | | |
|---|---|---|---|
| | 2 | 3 | 4 |
| Xanthan | 100.0 mg | 100.0 mg | 100.0 mg |
| Caffeine | 107.0 mg | 107.0 mg | 107.0 mg |
| Vanilla | 17.8 mg | 17.8 mg | 17.8 mg |
| 80% Phosphoric Acid | 593.0 mg | 593.0 mg | 593.0 mg |
| Citric Acid | 67.0 mg | 67.0 mg | 67.0 mg |
| Aspartame | 550.0 mg | 550.0 mg | 550.0 mg |
| Flavor | 42.0 mg | 42.0 mg | 42.0 mg |
| Caramel | 1325.0 mg | 1325.0 mg | 1325. mg |
| Sodium Saccharin | 10.0 mg | — | 4.0 mg |
| Calcium Saccharin | — | 11.0 mg | 6.6 mg |
| Beverage Levels | 1 liter | 1 liter | 1 liter |

EXAMPLES 5–7

Beverage formulations were made in accordance with Example 1 with variations in the xanthan gum type used.

| XANTHAN GUM FORMULATIONS | | | |
|---|---|---|---|
| | 5 | 6 | 7 |
| Xanthan Type | Keltrol T | Keltrol S | Agglomerated |
| Xanthan | 100.0 mg | 100.0 mg | 110.0 mg |
| Caffeine | 107.0 mg | 107.0 mg | 107.0 mg |
| Vanilla | 17.8 mg | 17.8 mg | 17.8 mg |
| 80% Phosphoric Acid | 593.0 mg | 593.0 mg | 593.0 mg |
| Citric Acid | 67.0 mg | 67.0 mg | 67.0 mg |
| Aspartame | 550.0 mg | 550.0 mg | 550.0 mg |
| Flavor | 42.0 mg | 42.0 mg | 42.0 mg |
| Caramel | 1325.0 mg | 1325.0 mg | 1325. mg |
| Sodium Saccharin | 10.0 mg | 10.0 mg | 10.0 mg |
| Beverage Levels | 1 liter | 1 liter | 1 liter |

EXAMPLES 8-17

Beverage formulations were made in accordance with Example 1 with variations being made in the type of hydrocolloidal polysaccharide being used.

HYDROCOLLOIDAL FORMULATIONS

| Gum Type | 8<br>Methyl Cellulose | 9<br>PGA 0 | 10<br>Low Viscosity<br>PGA LVF | 11<br>High Viscosity<br>PGA LVF | 12<br>Guar |
|---|---|---|---|---|---|
| Gum Level | 1000.0 mg | 900.0 mg | 550.0 mg | 375.0 mg | 1100.0 mg |
| Caffeine | 107.0 mg | 107.0 mg | 107.0 mg | 107.0 mg | 107.0 mg |
| Vanilla | 17.8 mg | 17.8 mg | 17.8 mg | 17.8 mg | 17.8 mg |
| 80% Phosphoric Acid | 593.0 mg | 593.0 mg | 593.0 mg | 593.0 mg | 593.0 mg |
| Citric Acid | 67.0 mg | 67.0 mg | 67.0 mg | 67.0 mg | 67.0 mg |
| Aspartame | 550.0 mg | 550.0 mg | 550.0 mg | 550.0 mg | 550.0 mg |
| Flavor | 42.0 mg | 42.0 mg | 42.0 mg | 42.0 mg | 42.0 mg |
| Caramel | 1325.0 mg | 1325.0 mg | 1325.0 mg | 1325.0 mg | 1325.0 mg |
| Sodium Saccharin | 10.0 mg | 10.0 mg | 10.0 mg | 10.0 mg | 10.0 mg |

| Gum Type | 13<br>Pectin | 14<br>Pectin/Guar | 15<br>Xanthan/PGA LVF | 16<br>Xanthan/PGA HVF | 17<br>Xanthan/Pectin |
|---|---|---|---|---|---|
| Gum Level | 875.0 mg | 504/63 | 25/375 | 25/250 | 50/518 |
| Caffeine | 107.0 mg | 107.0 mg | 107.0 mg | 107.0 mg | 107.0 mg |
| Vanilla | 17.8 mg | 17.8 mg | 17.8 mg | 17.8 mg | 17.8 mg |
| 80% Phosphoric Acid | 593.0 mg | 593.0 mg | 593.0 mg | 593.0 mg | 593.0 mg |
| Citric Acid | 67.0 mg | 67.0 mg | 67.0 mg | 67.0 mg | 67.0 mg |
| Aspartame | 550.0 mg | 550.0 mg | 550.0 mg | 550.0 mg | 550.0 mg |
| Flavor | 42.0 mg | 42.0 mg | 42.0 mg | 42.0 mg | 42.0 mg |
| Caramel | 1325.0 mg | 1325.0 mg | 1325.0 mg | 1325.0 mg | 1325.0 mg |
| Sodium Saccharin | 10.0 mg | 10.0 mg | 10.0 mg | 10.0 mg | 10.0 mg |

EXAMPLES 18-20

Beverage formulations were made in accordance with Example 1 with varying saccharin/aspartame blends (dependent on the target sweetness).

|  | 18 | 19 | 20 |
|---|---|---|---|
| Xanthan | 100.0 mg | 100.0 mg | 100.0 mg |
| Caffeine | 107.0 mg | 107.0 mg | 107.0 mg |
| Vanilla | 17.8 mg | 17.8 mg | 17.8 mg |
| 80% Phosphoric Acid | 593.0 mg | 593.0 mg | 593.0 mg |
| Citric Acid | 67.0 mg | 67.0 mg | 67.0 mg |
| Aspartame | 600.0 mg | 550.0 mg | 500.0 mg |
| Flavor | 42.0 mg | 42.0 mg | 42.0 mg |
| Caramel | 132.5 mg | 132.5 mg | 132.5 mg |
| Sodium Saccharin | 10.0 mg | 20.0 mg | 30.0 mg |
| Beverage Levels | 1 liter | 1 liter | 1 liter |
| Aspartame:Saccharin | 60:1 | 27.5:1 | 16.7:1 |

EXAMPLES 21-23

Beverage formulations were made in accordance with Example 1 with various flavor concentrates.

FLAVOR VARIATION FORMULAS

|  | 21<br>Lemon/Lime | 22<br>Orange | 23<br>Grape |
|---|---|---|---|
| Xanthan | 110.0 mg | 130.0 mg | 130.0 mg |
| Juice | 8.9 g | 9.0 g | 21.0 g |
| Flavor | 1.5 g | 2.4 g | 1.2 g |
| Citric Acid | 1.5 g | 2.1 g | 370.0 mg |
| Malic Acid | — | 61.6 mg | 1.1 g |
| Potassium Benzoate | 384.0 mg | 384.0 mg | 420.0 mg |
| Potassium Citrate | 238.0 mg | 333.0 mg | 40.0 mg |
| Aspartame | 525.0 mg | 650.0 mg | 550.0 mg |
| Sodium Saccharin | 10.0 mg | 10.0 mg | 10.0 mg |
| Sodium Chloride | — | 100.0 mg | — |
| Calcium Disodium Edetate | — | 30.0 mg | — |
| Potassium Sorbate | — | — | 155.0 mg |
| Ascorbic Acid | 20.0 mg | — | — |

EXAMPLES 24-26

Beverage formulations were made in accordance with Example 1 with varying amounts of sodium saccharin-APM in order to achieve various desired brix levels.

FORMULATIONS OF VARIOUS BRIX/SUGAR LEVELS

|  | 24 | 25 | 26 |
|---|---|---|---|
| Xanthan | 100 mg | 100 mg | 100 mg |
| Caffeine | 107 mg | 107 mg | 107 mg |
| Vanilla | 17.8 mg | 17.8 mg | 17.8 mg |
| 80% Phosphoric Acid | 593 mg | 593 mg | 593 mg |
| Citric Acid | 67 mg | 67 mg | 67 mg |
| Aspartame | 550 mg | 438 mg | 680 mg |
| Flavor | 42 mg | 42 mg | 42 mg |
| Caramel | 1325 mg | 1325 mg | 1325 mg |
| Sodium Saccharin | 10 mg | 8 mg | 12 mg |
| Beverage Levels | 1 liter | 1 liter | 1 liter |
| Comparable Brix Level | 11.2° | 9° | 14° |

The Brix sale is a hydrometer scale for sugar solutions indicating the percentage by weight of sugar in a solution at a specified temperature. The degree Brix equals percent by weight of sucrose in the solution and is related empirically to the specific gravity.

We claim:

1. A beverage composition most closely imitating a high fructose corn syrup-sweetened beverage comprising at least one food-acceptable hydrocolloidal polysaccharide in the range of about 25 to about 800 mg/l, a saccharin salt, and aspartame, the ratio of said aspartame to said saccharin salt being in the range of about 50:1 to about 25:1.

2. A beverage composition according to claim 1 wherein the said hydrocolloidal polysaccharide is a natural gum.

3. A beverage composition according to claim 1 wherein the said hydrocolloidal polysaccharide is a modified gum.

4. A beverage composition according to claim 1 wherein the said hydrocolloidal polysaccharide is xanthan gum.

5. A beverage composition according to claim 1 wherein the said hydrocolloidal polysaccharide is guar gum.

6. A beverage composition according to claim 1 wherein the said hydrocolloidal polysaccharide is an alkyl cellulose ether.

7. A beverage composition according to claim 6 where the alkyl cellulose is methyl cellulose.

8. A beverage composition according to claim 1 wherein the said hydrocolloidal polysaccharide is pectin.

9. A beverage composition according to claim 1 wherein the said hydrocolloidal polysaccharide is propylene glycol alginate.

10. A beverage composition according to claim 1 wherein the said hydrocolloidal polysaccharide is a mixture of xanthan and at least one other hydrocolloidal polysaccharide.

11. A beverage composition according to claim 1 wherein the said hydrocolloidal polysaccharide is a mixture of pectin and guar gum.

12. A beverage composition according to claim 1 wherein the saccharin salt is sodium saccharin.

13. A beverage composition according to claim 1 wherein the saccharin salt is a calcium saccharin.

14. A beverage composition according to claim 1 wherein the saccharin salt is a combination of sodium saccharin and calcium saccharin.

15. The beverage composition according to claim 1 wherein the said hydrocolloidal polysaccharide is a natural gum.

* * * * *

UNITED STATES PATENT AND TRADEMARK OFFICE
CERTIFICATE OF CORRECTION

PATENT NO. : 5,126,158
DATED : June 30, 1992
INVENTOR(S) : Sharkasi, et al.

It is certified that error appears in the above-indentified patent and that said Letters Patent is hereby corrected as shown below:

Column 3, line 50: "beverage" should read as --beverages--

Column 4, line 34: "preferable" should read as --preferably--

Column 6, line 43: "1325. mg" should read as --1325.0 mg--

Column 8, line 41: "levels." should read as --levels.*--

Column 8, line 57: "The" should read as --*The--

Column 9, line 18, Claim 7: "where" should read as --wherein--

Signed and Sealed this

Twenty-fifth Day of January, 1994

Attest:

BRUCE LEHMAN

Attesting Officer    Commissioner of Patents and Trademarks